(12) United States Patent
Caputo et al.

(10) Patent No.: US 11,334,574 B2
(45) Date of Patent: May 17, 2022

(54) METHODS AND DEVICES FOR IDENTIFYING RELEVANT INFORMATION FOR A FIRST ENTITY

(71) Applicant: The Toronto-Dominion Bank, Toronto (CA)

(72) Inventors: Eugenio Caputo, Woodbridge (CA); Cameron Scott Wiginton, Richmond Hill (CA); Derek Murray Payne, Oakville (CA); Michelle Lemoine, Virgil (CA); Julie Elizabeth Hawthorne, Milton (CA); Avinash Malliah, Toronto (CA); Wendy Gayle Brisebois, Toronto (CA); Darren Johnston, Kitchener (CA); Rhonda Brenda Weppler, Burlington (CA); Dennis Harold Parker, Toronto (CA); Jonathan Robert Curran, Georgetown (CA); Trevor James Van Arragon, Burlington (CA); Gregory Boddison, Toronto (CA); Matthew Allan Pitcher, Aurora (CA); Angelique Louise Carle, Sutton West (CA)

(73) Assignee: The Toronto-Dominion Bank, Toronto (CA)

(*) Notice: Subject to any disclaimer, the term of this patent is extended or adjusted under 35 U.S.C. 154(b) by 487 days.

(21) Appl. No.: 16/126,426

(22) Filed: Sep. 10, 2018

(65) Prior Publication Data
US 2020/0081990 A1    Mar. 12, 2020

(51) Int. Cl.
*G06F 16/25* (2019.01)
*G06F 16/22* (2019.01)
(Continued)

(52) U.S. Cl.
CPC .... *G06F 16/24578* (2019.01); *G06F 16/2228* (2019.01); *G06F 16/2358* (2019.01); *G06F 16/25* (2019.01); *G06F 16/254* (2019.01)

(58) Field of Classification Search
CPC ..................................................... G06F 16/254
See application file for complete search history.

(56) References Cited

U.S. PATENT DOCUMENTS 9,154,397 B2 * 10/2015 Reynolds .............. H04L 41/142
10,713,321 B1 * 7/2020 Wen ...................... G06N 5/022
(Continued)

OTHER PUBLICATIONS

Rubio, https://www.infoq.com/news/2012/08/GoogleCMReplacesC2Dm/, Google Cloud Messaging for Android (GCM) Unveiled, to Replace C2DM Framework, Aug. 13, 2012 (Year: 2012).*

*Primary Examiner* — James E Richardson
*Assistant Examiner* — Nirav K Khakhar
(74) *Attorney, Agent, or Firm* — Duane Morris LLP

(57) ABSTRACT

Some aspects provide: analyzing data exchange database records of a first entity; determining a sector with which the first entity is associated by at least one of the analyzing and first entity input identifying the sector; analyzing data exchange database records of second entity(ies) different from the first entity, to determine sector associated second entity(ies) data exchanges; analyzing the sector associated second entity(ies) data exchange records to determine data baseline(s); analyzing the first entity data exchange records to determine first entity data baseline(s), at least one of which corresponding in type to a respective one of the data baseline(s); comparing one of the data baseline(s) to a corresponding one of the first entity data baseline(s); identifying the relevant information based on the comparing; and notifying, via a communication module of the computing (Continued)

device, over a network, an electronic device associated with the first entity of the relevant information.

22 Claims, 3 Drawing Sheets

(51) Int. Cl.
 *G06F 16/2457* (2019.01)
 *G06F 16/23* (2019.01)

(56) References Cited

U.S. PATENT DOCUMENTS

| | | | | |
|---|---|---|---|---|
| 2003/0130975 | A1* | 7/2003 | Muller | G06Q 10/06 706/50 |
| 2005/0004857 | A1* | 1/2005 | Schwarz | G06Q 40/06 705/36 R |
| 2005/0209987 | A1* | 9/2005 | Beres | G06F 16/334 |
| 2011/0106743 | A1* | 5/2011 | Duchon | G06F 16/35 706/46 |
| 2012/0278321 | A1* | 11/2012 | Traub | G06F 16/3331 707/736 |
| 2013/0227714 | A1* | 8/2013 | Gula | G06F 21/64 726/32 |
| 2014/0344186 | A1* | 11/2014 | Nadler | G06Q 10/067 705/36 R |
| 2015/0025917 | A1* | 1/2015 | Stempora | G06K 9/0061 705/4 |
| 2015/0339446 | A1* | 11/2015 | Sperling | G06F 19/00 705/3 |
| 2016/0034512 | A1* | 2/2016 | Singhal | G06F 16/35 707/737 |
| 2016/0034514 | A1* | 2/2016 | Singhal | G06F 16/9535 707/706 |
| 2016/0364740 | A1* | 12/2016 | Parker | G06Q 30/0205 |
| 2017/0116307 | A1* | 4/2017 | Kapoor | G06F 16/213 |
| 2017/0126710 | A1* | 5/2017 | De-Levie | G06F 16/24575 |

* cited by examiner

METHODS AND DEVICES FOR IDENTIFYING RELEVANT INFORMATION FOR A FIRST ENTITY

TECHNICAL FIELD

The following relates generally to methods and devices for identifying information for entities based on information in data exchange records. More specifically, the following relates to methods and devices for identifying relevant information for entities, and methods and devices for determining, and identifying information to manage, levels of risk for entities, based on information in data exchange records.

BACKGROUND

Existing databases of various institutions contain data exchange records for various entities. For example, records of blood donations to a blood bank by various entities or individuals are tracked and maintained in digital format. Social media networks and financial institutions also retain large databases of data exchange records for various entities. There remains a need to effectively leverage the existing big data of institutions to cultivate relationships with entities (such as by identifying information of relevance for the entities) and/or to make informed decisions about possible interactions with entities based on levels of risk for the entities determined from the data.

SUMMARY

In an aspect of the present application there is provided a computing device for identifying relevant information for a first entity. The computing device comprises: a memory storing computer-executable instructions; a communication module for communication with an electronic device associated with the first entity over a network; and a processor coupled to the memory and the communication module. The instructions when executed by the processor cause the processor to: analyze records of data exchanges of the first entity stored in a database accessible to the processor; determine a sector with which the first entity is associated by at least one of: (i) analyzing the stored records of first entity data exchanges; and (ii) analyzing input received from the first entity, the input identifying the sector; analyze records of data exchanges of one or more second entities different from the first entity stored in the database, to determine which of the one or more second entities data exchange records involve other entities associated with the sector, to determine sector associated one or more second entities data exchanges; analyze the stored records of the sector associated one or more second entities data exchanges to determine one or more data baselines; analyze the stored records of the first entity data exchanges to determine one or more first entity data baselines, at least one of the one or more first entity data baselines corresponding in type to a respective one of the one or more data baselines; compare one of the one or more data baseline(s) to a corresponding one of the first entity one or more data baseline(s); identify the relevant information based on the comparison; and notify, via the communication module, the electronic device associated with the first entity of the relevant information.

In another aspect of the present application there is provided a computer-implemented method for identifying relevant information for a first entity. The method comprises: analyzing records of data exchanges of the first entity stored in a database accessible to a processor of a computing device; determining a sector with which the first entity is associated by at least one of: (i) analyzing the stored records of first entity data exchanges; and (ii) analyzing input received from the first entity, the input identifying the sector; analyzing records of data exchanges of one or more second entities different from the first entity stored in the database, to determine which of the one or more second entities data exchange records involve other entities associated with the sector, to determine sector associated one or more second entities data exchanges; analyzing the stored records of the sector associated one or more second entities data exchanges to determine one or more data baselines; analyzing the stored records of the first entity data exchanges to determine one or more first entity data baselines, at least one of the one or more first entity data baselines corresponding in type to a respective one of the one or more data baselines; comparing one of the one or more data baseline(s) to a corresponding one of the first entity one or more data baseline(s); identifying the relevant information based on the comparing; and notifying, via a communication module of the computing device, over a network, an electronic device associated with the first entity of the relevant information.

In yet another aspect of the present application there is provided a non-transitory computer-readable medium comprising computer-executable instructions for identifying relevant information for a first entity. The instructions when executed by a processor of a computing device cause the processor to: analyze records of data exchanges of the first entity stored in a database accessible to the processor; determine a sector with which the first entity is associated by at least one of: (i) analyzing the stored records of first entity data exchanges; and (ii) analyzing input received from the first entity, the input identifying the sector; analyze records of data exchanges of one or more second entities different from the first entity stored in the database, to determine which of the one or more second entities data exchange records involve other entities associated with the sector, to determine sector associated one or more second entities data exchanges; analyze the stored records of the sector associated one or more second entities data exchanges to determine one or more data baselines; analyze the stored records of the first entity data exchanges to determine one or more first entity data baselines, at least one of the one or more first entity data baselines corresponding in type to a respective one of the one or more data baselines; compare one of the one or more data baseline(s) to a corresponding one of the first entity one or more data baseline(s); identify the relevant information based on the comparison; and notify, via a communication module of the computing device, over a network, an electronic device associated with the first entity of the relevant information.

BRIEF DESCRIPTION OF THE DRAWINGS

Aspects of the application will now be described by way of example only with reference to the appended drawings in which.

DETAILED DESCRIPTION

Figure 1:
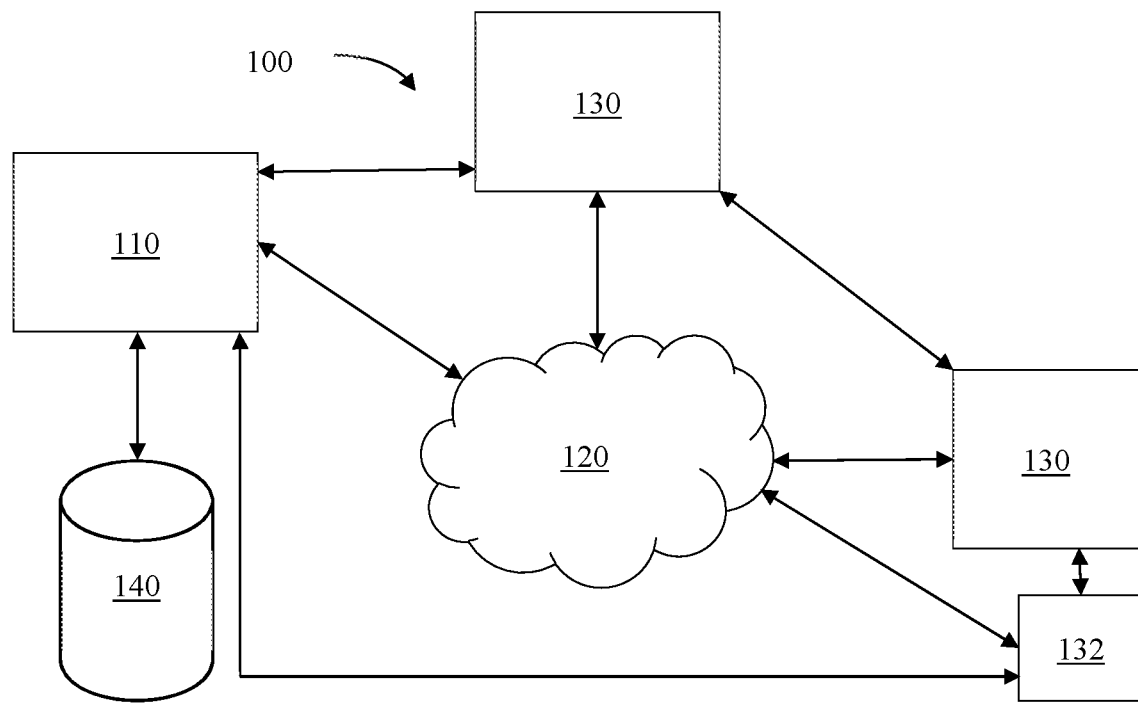
FIG. 1 depicts a schematic diagram of an exemplary aspect of a system described herein.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practised without these specific details. In other instances, well-known methods, procedures and components have not been described in detail so as not to obscure the exemplary aspects described herein. Also, the description is not to be considered as limiting the scope of the exemplary aspects described herein. Any systems, method steps, components, parts of components, and the like described herein in the singular are to be interpreted as also including a description of such systems, method steps, components, parts of components, and the like in the plural, and vice versa.

The person of skill in the art will appreciate that there are delays inherent to any form of communication, including wired or wireless digital communication, including over a digital network, and as such, as used herein, the term "real-time" includes real-time and substantially real-time communication.

Institutions, such as blood banks, gather vast amounts of data from various entities (such as patrons, donators, volunteers, and any other personal or business entity that may provide information or data pertaining to the entity to an institution with which it interacts). For example, financial institutions, such as retail banks, gather vast amounts of data on the data exchanges, or financial transactions, of its various personal and business entity customers. Discussed below are methods and computing devices for identifying relevant information for entities, and methods and devices for determining, and identifying information to manage, levels of risk for entities, based on information in data exchange records.

Figure 2:
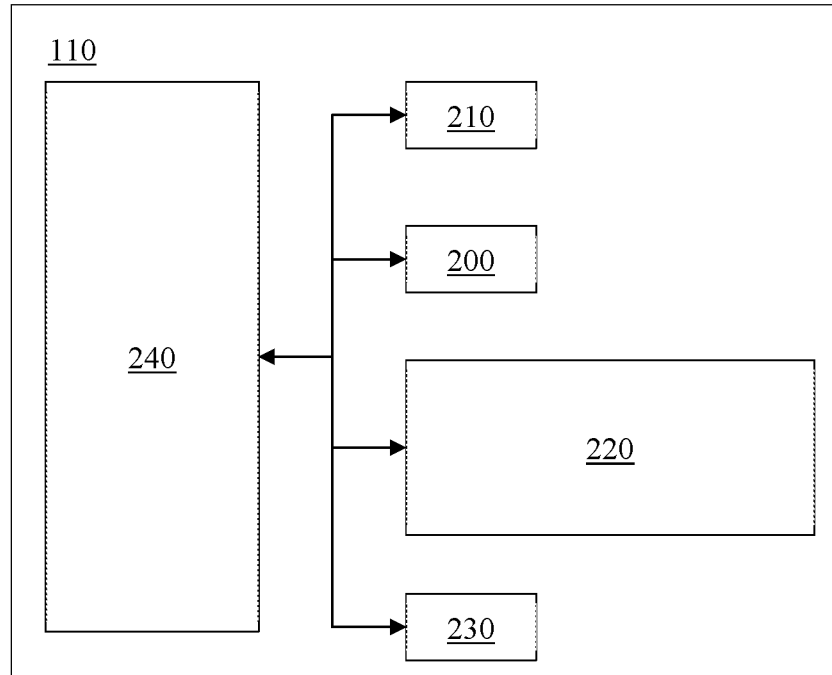
FIG. 2 depicts a schematic diagram of an exemplary aspect of a computing device described herein.

With reference to FIG. 1 and FIG. 2, system 100 includes a computing device 110 in digital communication with one or more entities 130 over a network 120. Database 140 may be co-located or form a part of the computing device 110, or otherwise be accessible to a processor of the computing device 110, such as over network 120.

Computing device 110 may comprise memory 200, communication module 210, a display 220, one or more input devices 230, and at least one processor 240 coupled to the memory 200, communication module 210, display 220, and input device(s) 230. Communication module 210 enables computing device 110 to communicate with one or more other components of system 100, such as one or more entities 130 (such as the first entity 130, one or more second entities 130, or other entities 130 described below), and/or an electronic device 132 associated with any such entities 130, via a wired or wireless communication network, such as network 120. Network 120 may comprise a direct link between communicating components of system 100, or an indirect one, including but not limited to communication by Ethernet™, Bluetooth™, WiFi™, ZigBee™, Z-Wave™, 6LowPAN™, Thread™, NFC (near-field communication), SigFox™, infrared, WiMAX™ (fixed or mobile), RFID (radio-frequency identification), Neul™, LoRaWAN™, CoAP (Constrained Application Protocol), MQTT (Message Queue Telemetry Transport), and any suitable cellular communications protocols including, but not limited to, up to 5G protocols, such as GSM, GPRS, EDGE, CDMA, UMTS, LTE, LTE-A, IMS, for example, and any other communications protocols suitable for the method(s), system(s) and device(s) described herein, including any proprietary protocols. Network 120 may comprise a single network or more than one interconnected network, of any type suitable for the method(s), system(s) and device(s) described herein, including but not limited to wired or wireless PANs (personal area networks), LANs (local area networks), WANs (wide area networks), MANs (metropolitan area networks), mesh or ad hoc networks, VPNs (virtual private networks), the Internet, and any other suitable network type, in any suitable network configuration or topology (e.g., mesh, token ring, tree, star, etc.), and any interconnected combination of the foregoing. Although not shown in FIG. 1, system 100 may further include any components necessary to effect the communication and/or network type(s) used, and may also include components for increased network security, for example, access points, routers, and firewalls.

As used herein, the term "memory" (such as memory 200), or any variation thereof, may comprise a tangible and non-transitory computer-readable medium (i.e., a medium which does not comprise only a transitory propagating signal per se) comprising or storing computer-executable instructions, such as computer programs, sets of instructions, code, software, and/or data for execution of any method(s), step(s) or process(es) described herein by any processor(s) described herein, including processor(s) 240. Memory may comprise one or more of a local and/or remote hard disk or hard drive, of any type, ROM (read-only memory) and/or RAM (random-access memory), buffer(s), cache(s), flash memory, optical memory (e.g., CD(s) and DVD(s)), and any other form of volatile or non-volatile storage medium in or on which information may be stored for any duration. Such computer-executable instructions, when executed by processor 240 of computing device 110, cause the processor to perform any of the methods described herein, such as methods for identifying relevant information for a first entity, and methods for determining, and identifying information to manage, a level of risk of a first entity (as further described below). It will be appreciated that the method steps described herein may be implemented in a variety of programming languages.

Input device(s) 230 provides a mechanism for a user of computing device 110 to provide input(s) to computing device 110, such as during the execution of computer programs stored in memory 200, for processing by processor 240. Input device(s) 230 may include a touch-sensitive display, physical or virtual keyboard, keypad, mouse, microphone, trackpad, scroll wheel or ball, or other suitable device capable of receiving or detecting an input. Display 220 may comprise any screen suitable for displaying visual information, including any suitable touch-sensitive display (in which cases display 220 may also serve as an input device 230 of computing device 110), such as a touch-sensitive display based on capacitive, resistive, infrared, surface acoustic wave (SAW), strain gauge, optical imaging, acoustic pulse recognition, dispersive signal technology, or any other suitable technology known in the art.

Computing device 110 may comprise a personal computer and/or one or more servers (such as for redundancy). Method steps described herein requiring user input may be carried out through a client interface of a software application executed by processor 240 of computing device 110, such as a web portal on computing device 110 or on any networked device, such as a tablet or desktop computer. Computing device 110 may represent a system of known components, including one or more servers, databases, I/O devices, access terminals, communications pathways, and any other components necessary in order for computing device(s) 110 to effect method step(s) described herein, as would be known to the person of skill in the art. As a non-limiting example, a computing device 110 may comprise a financial server hosting a financial software application of a financial institution, such as a bank, and a user of computing device 110 (such as a bank employee) may have access to the financial application hosted by computing device 110, such as through an interface (e.g., web portal, or a GUI of the financial software application) on computing device 110 or via an "app" or web browser on another device communicatively coupled to computing device 110, such as a smart phone, tablet, or computer accessing the financial software over network 120, such as via a secure connection (e.g., VPN connection).

Figure 3:
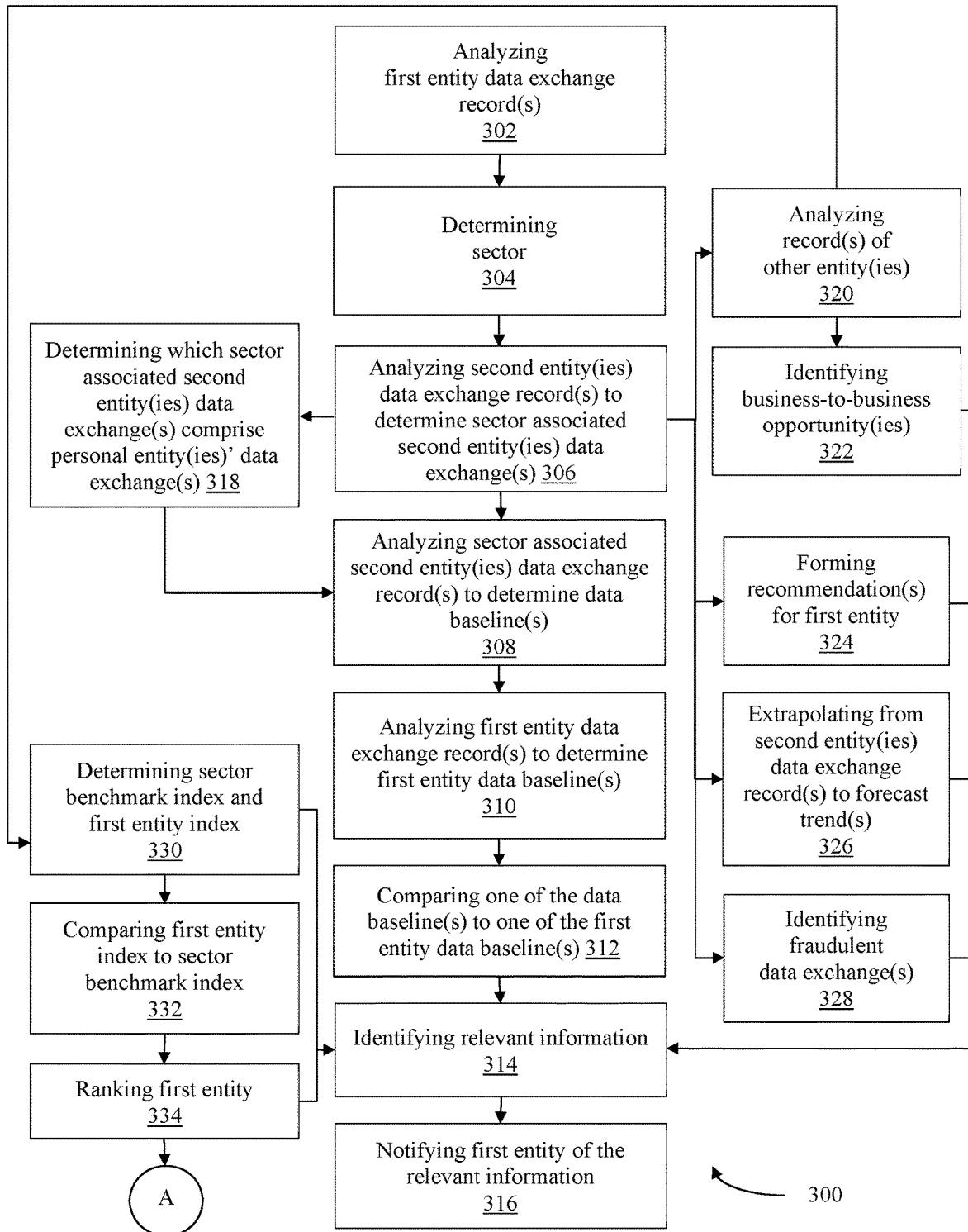
FIG. 3 depicts a flow diagram of an exemplary aspect of computer-executable instructions described herein.

With reference to FIG. 3, in accordance with an exemplary aspect of the present application, instructions, when executed by processor 240, cause the processor to carry out steps of method 300 for identifying relevant information for a first entity. Method 300 may comprise analyzing 302 records of data exchanges of first entity 130 stored in database 140 accessible to processor 240; determining 304 a sector with which the first entity is associated by at least one of: (i) analyzing the stored records of first entity data exchanges; and (ii) analyzing input received from the first entity that identifies the sector; analyzing 306 records of data exchanges of one or more second entities 130 different from the first entity stored in database 140, to determine which of the one or more second entities data exchange records involve other entities associated with the sector, to determine sector associated one or more second entities data exchanges; analyzing 308 the stored records of the sector associated one or more second entities data exchanges to determine one or more data baselines; analyzing 310 the stored records of the first entity data exchanges to determine one or more first entity data baselines, at least one of which corresponds in type to a respective one of the data baseline(s); comparing 312 one of the one or more data baseline(s) to a corresponding one of the first entity one or more data baseline(s); identifying 314 the relevant information based on the comparison; and notifying 316 (e.g., via communication module 210) the first entity 130 of the relevant information.

In accordance with some aspects, notifying 316 the first entity of the relevant information may be done in real-time, by push notification, upon identifying the relevant information. Alternatively, first entity 130 may request (such as by a financial or banking app configured to communicate with computing device 110, or which may comprise a client instance of computing device 110 having only informational or reporting features for the user), over network 120, the relevant information from computing device 110 and pull the relevant information. The notification may comprise, for example, an audible and/or visual alert displayed on a display of another device (e.g., a mobile device, computer, tablet, etc.) by which a graphical user interface of an application hosted by the institution (such as a financial or banking app for a financial institution) is accessed by the first entity or a representative of the first entity, or a message sent via communication module to a digital address of such first entity or first entity representative (e.g., SMS, MMS, instant message, email, a proprietary message type, etc.). It will be appreciated by the person of ordinary skill in the art that any suitable type of notification message may be used.

In an exemplary aspect, computing device 110 comprises a computing device of a financial institution, and first entity 130 and the one or more second entities 130 comprise customers of the financial institution. In such aspects, the data exchanges comprise financial transactions of the financial institution's customers 130, which are received over time by the computing device 110 of the financial institution over network 120, and stored in database 140. In these aspects, the steps of analyzing 302 and 306 records of data exchanges comprise analyses of historical transaction or data exchange records of the customers of the financial institution that have been stored in the financial institution's database(s) 140. Further, in such aspects, the first entity comprises a customer of the financial institution for which the computing device determines the relevant information (or, with reference to method 400 described below, for which the computing device determines, and identifies information to manage, a level of risk), and the one or more second entities that are different from the first entity comprise all other customers of the financial institution. In such aspects, at step 306, the other entities associated with the sector comprise other business customers of the financial institution that are, e.g., identified by processor 240 as transacting parties in the analyzed data exchange records that are associated with the same sector as the first entity. Further, in such aspects, the sector may comprise a business sector with which the first entity is associated. For example, the first entity may be a retail coffee shop business customer, in which case the sector with which the first entity is associated may comprise "retail", "food and drink", and/or "retail coffee", for example. Further, in such aspects, the "sector associated one or more second entities data exchanges" comprise data exchange or transaction records stored in the financial institution's database 140 that involve personal or business customers other than the first entity (i.e., which do not include the first entity as any of the transacting parties of the data exchange) and which involve as a transacting party a business customer other than the first entity associated with the sector. For example, the sector associated one or more second entities data exchanges may include a transaction record between a patron and Retail Coffee Shop ABC in which the patron purchased a small coffee via a debit transaction (such as an Interac® debit transaction), and a transaction record involving Retail Coffee Shop XYZ's purchase of chairs from a furniture manufacturer; both data exchange or transaction records involve other entities (Retail Coffee Shop ABC and Retail Coffee Shop XYZ) that are not the first entity (e.g., Retail Coffee Shop 123) and belong to the same sector as the first entity (e.g., "retail coffee").

Methods 300 and 400 may determine more than one relevant information or level of risk, by basing the respective analysis on more than one sector (i.e., sectors of varying breadth, as discussed above). The instructions executed by processor 240 may comprise instructions allowing for sectors to be pre-configured, such as in database 140, and/or allowing for configuration of sector breadth (e.g., a user of computing device 110, such as a bank employee, may configure the financial software comprising the instructions that cause processor 240 to execute methods 300 and 400 to set the sector breadth somewhere between a broad (e.g., "retail") and narrow (e.g., "retail coffee") sector.

At step 304, the instructions when executed by processor 240 cause the processor to determine 304 the sector with which the first entity is associated. Sector determination may be done by analyzing the stored records of first entity data exchanges. For example, analysis of the first entity data exchange records may show that the first entity regularly buys coffee beans from a supplier and sells coffee to customers, and processor 240 may then accordingly determine the first entity data exchange records to be associated with the "coffee retail" sector. Sector determination may also, or alternatively, be determined by reference to sources of public information. For example, the instructions when executed by processor 240 may cause the processor to look up, e.g., Starbucks® (where Starbuck® is the first entity) on the Internet to determine that an appropriate sector is "coffee retail". Additionally, or alternatively, sector determination may be achieved via input from the first entity that identifies the sector. This may be done, e.g., when the first entity establishes a customer relationship with the financial institution (e.g., by opening one or more financial accounts) and identifies itself as a company operating in the "coffee", "food and drink" and/or "retail coffee" sector(s), for example. The instructions described herein may use artificial intelligence (AI) and/or machine learning (ML) to carry out any suitable method steps described herein, including step 304 discussed above (e.g., to appropriately analyze public information and/or the information contained in data exchange records). In accordance with an aspect, the instructions when executed by processor 240 may cause the processor to assign a unique code to the determined sector for storage in database 140 as an attribute of, or related to, the data exchange records. The unique code may be generated by the processor, or may be based on a known standard for business sector classification, such as a Standard Industrial Classification (SIC) code.

At step 308, one or more data baselines are determined for the sector associated one or more second entities data exchange records. Such baselines (including the first entity data baselines, described below) may comprise or relate to, e.g., the transacting merchant, data exchange location, payment amount, and/or payment type (the payment type may comprise, e.g., credit card, gift card, debit card, mobile payment, cash, and any other suitable or known payment types). Still with reference to FIG. 3, in accordance with a further aspect of the present application, method 300 may further comprise determining 318 which of the sector associated one or more second entities data exchanges comprises data exchanges of personal (i.e., non-business) entities, in which case the one or more data baselines determined at step 308 (such as the example baselines discussed above) may comprise one or more baselines for the personal entities. For example, one baseline related to the transacting merchants identified in each of the sector associated one or more second entities data exchange records may comprise the percentage of customers in the sector that transact with each merchant. Another baseline may comprise the percentage of customers that buy their coffee in region A (e.g., downtown Toronto), region B (e.g., a suburb West of Toronto), and so on (more broad or narrow geographic regions could be used). Further baselines or values attributed thereto, not described herein, may be covered by the present application, and the types of baselines and baseline values are not intended to restrict the presently described aspects. For example, the payment types described above are not limiting on the presently described aspects, and yet further payment types, not presently in widespread use, known or contemplated, may be covered by the presently described aspects (such as blockchain-based payment systems, biometric based payment systems, and so on). At least one of the first entity data baselines determined at step 310 corresponds in type to one of the data baseline(s) determined at step 308, so that the step of comparing 312 comprises comparing a data baseline to a first entity data baseline of a corresponding type.

Still with reference to FIG. 3, in accordance with a further aspect of the present application, method 300 may further comprise: analyzing 320 the stored records of the other entities associated with the sector (which may comprise business entities); and identifying 322, from the analysis of the stored records of the other entities associated with the sector, one or more potential business-to-business opportunities for the first entity (which may comprise a business entity). The relevant information may then comprise the identified one or more potential business-to-business opportunities. For example, an analysis of the data exchange records of the other entities in the sector may reveal other suppliers of products similar to those purchased by the first entity, which suppliers supply the like products at comparable or lower prices than the prices paid by the first entity. As another example, such analysis may reveal that the first entity and another business entity in the sector sell complimentary products and that there may be efficiencies to be gained from a partnership between the entities. As discussed previously, this step, and any other suitable step discussed herein, may be carried out using AI and/or ML.

Still with reference to FIG. 3, in accordance with a further aspect of the present application, method 300 may further comprise: forming 324 one or more recommendations for the first entity from the analyzed records of the one or more second entities data exchanges. In this case, the relevant information may comprise the one or more recommendations. The recommendations may comprise, e.g., notifications of marketing opportunities. For example, in the case where the institution carrying out the analysis of the data exchange records is a financial institution, such as a retail bank, if the analysis of the one or more second entities data exchanges (i.e., all transaction records in database 140 other than the first entity's transaction records) reveals that there has been a spike in new, young adults carrying out transactions in Region A, a recommendation may be to cater marketing in Region A to young adults. Conversely, a recommendation may comprise an avoidance measure, such as where analysis of the one or more second entities data exchange records reveals a comparatively low population for a retail location of the first entity (e.g., as compared to an analysis of populations within regions around locations of competitors of the first entity), in which case the recommendation may comprise a warning of low population and thus, low opportunities for sales, for example.

In another aspect of the present application, method 300 may also comprise extrapolating 326 from the analyzed records of the one or more second entities data exchanges to forecast one or more trends. In this case, the relevant information may comprise the forecasted one or more trends. The instructions when executed by processor 240 may cause the processor to analyze the one or more second entities data exchange records at different points in time in order to obtain different data points from which the extrapolation can be made. Additionally, or alternatively, reference may be made to the historical one or more second entities data exchange records in database 140, at one or more points in the past, in order to obtain the various data points from which the extrapolation can be made. Additionally, or alternatively, reference may be made to public sources of information, such as on the Internet, in order to obtain data points from which the extrapolation can be made (such as population statistics available on the Internet from public census records). For example, with reference to the population-based recommendation above, it may be forecasted, from an extrapolation from the analyzed one or more second entities data exchange records, that population for an area served by a first entity location is trending upward or downward. As another example, a forecast of an increasing trend in mobile payments may be determined.

As a further example of relevant information that may be determined, method 300 may also comprise identifying 328 one or more instances of fraudulent data exchanges from the analyzed records of the one or more second entities data exchanges. The relevant information may then comprise the identified one or more instances of fraudulent data exchanges. Step 328 may comprise analysis of data exchange/transaction records, and/or may comprise analysis of data derived from public sources and/or interactions with the one or more second entities (e.g., when customers of a financial institution report instances of fraud to a bank).

Still with reference to FIG. 3, in accordance with a further aspect of the present application, method 300 may further comprise, after the step of analyzing 320 the stored records of the other entities associated with the sector, determining 330 a benchmark index for the sector and an index for the first entity based on respective one or more factors of the other entities and the first entity. The relevant information may comprise the sector benchmark index and/or the first entity index. The one or more factors may comprise, for a time period: revenues, profits, and/or volume of product sold, for example. The time period for the analyzed factor(s) may be pre-configured by a user of computing device 110 via input device 230, and/or the instructions may include a default time period which may be overwritten by the user input. Further factors not described herein may be covered by the present application, and the types of factors are not intended to restrict the presently described aspects. Method 300 may further comprise comparing 332 the first entity index to the sector benchmark index and ranking 334 the first entity against the other entities based on the comparison. In such cases, the relevant information may comprise the rank, and it is expected that the rank (identifying for the first entity its ranking against its competitors, for example, based on one or more factors) would provide yet a further source of useful information to the first entity from the data exchange records of the institution. For example, it may be of use for marketing purposes that the first entity knows how it ranks against the other entities in the sector in terms of revenues by region. It may also be of use to the first entity to know how it ranks against the other entities in the sector based on a combination of factors that are combined to determine the benchmark index and first entity index. The various factors may be combined to derive the respective indexes by known mathematical formulas for benchmarking based on a plurality of factors, as would be known in the art. In accordance with a further aspect, rather than determining 330 a single benchmark index based on multiple factors, separate benchmark indexes may be determined, each based on a respective one of the factors, and respective indexes may also be determined for the first entity. In this case, the steps of comparing 332 and ranking 334 may be based on separate comparisons and rankings for each such factor and the related indexes for the sector and the first entity.

In aspects described herein, methods steps involving the sharing of information obtained from data exchange records may involve the anonymizing of such information prior to its dissemination, in order to comply with applicable laws (e.g., privacy laws).

The presently described aspects are expected to allow an institution (such as a financial institution) to identify relevant information for entities (such as the first entity described herein, which may, e.g., be a business customer of the financial institution) from its existing data exchange records, to thereby leverage its data (which may be extensive, and thus comprise "big data") to cultivate relationships with any such first entity. For example, the identified relevant information may comprise information on the number of coffee shop customers that purchase coffee from Retail Coffee Shop ABC versus the first entity (Retail Coffee Shop 123). As another example, where the baselines compared comprise coffee bean suppliers, the analysis of the data exchange records may reveal that merchants with greater sales than the sales of the first entity are supplied by a particular coffee bean supplier, and so the relevant information may comprise an indication of the coffee bean supplier supplying the more successful coffee retailers. The first entity may then, for example, use the relevant information to conduct further analysis (such as by investigating the bean quality and taste of the beans supplied to the more successful retailers), or may make a determination to switch bean suppliers based solely on the relevant information. As described herein, the presently described aspects may use AI and/or ML in carrying out any of the method steps described herein that are suitable for implementation using AI and/or ML, and may use information from both the data exchange records in database 140 and public sources of digital information (such as the Internet) to determine relevant information (or other information required in the described method steps) to allow the first entity to make informed decisions about its business and/or data exchanges. As described above, the relevant information may comprise, e.g., trends or forecasts, recommendations, warnings of fraudulent transactions, rankings, and other information derived from the described comparisons and/or from analysis of the data exchange records, and in that manner, the presently described aspects leverage existing data to cultivate relationships with entities.

Figure 4:
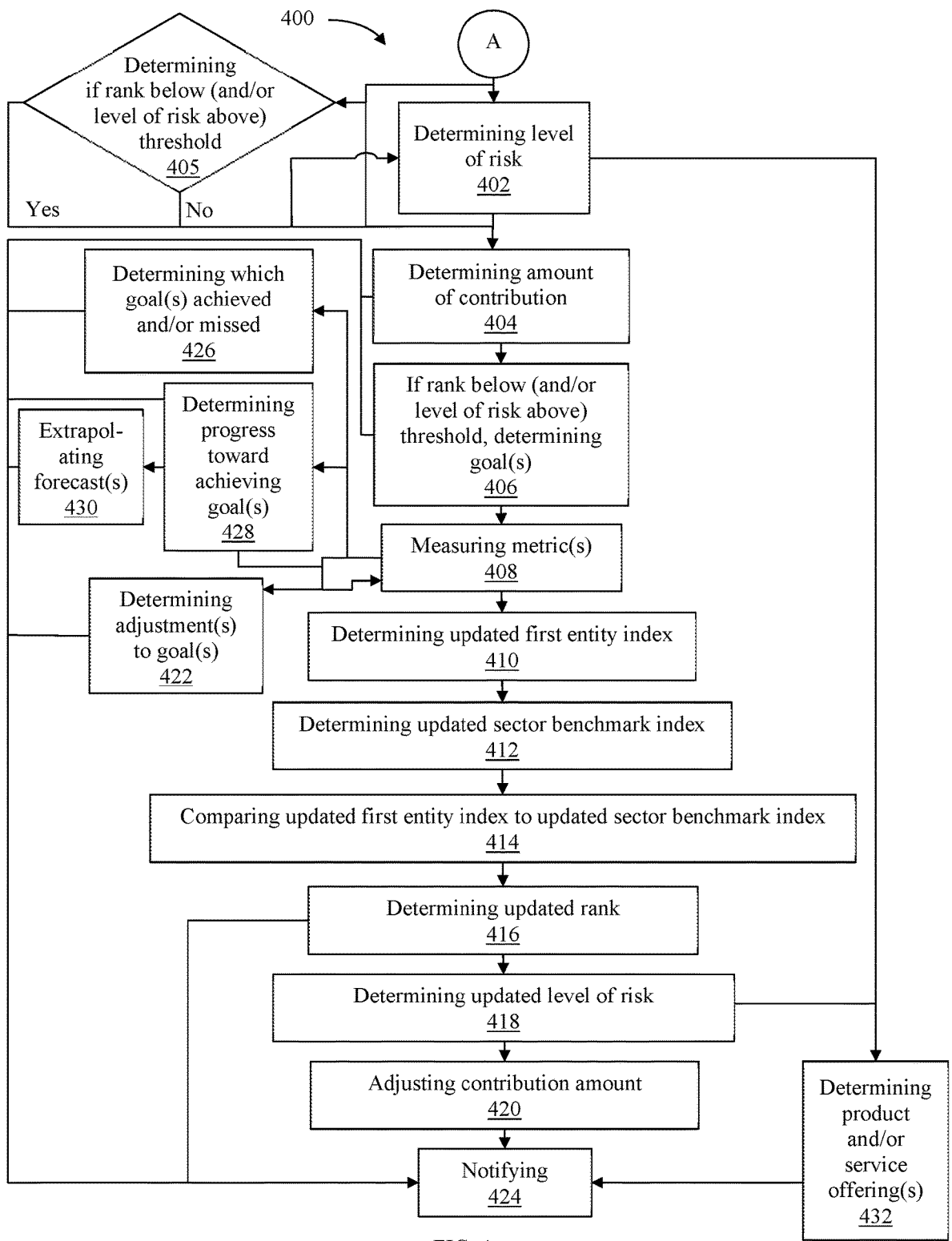
FIG. 4 depicts a flow diagram of another exemplary aspect of computer-executable instructions described herein.

With reference to FIG. 4, in accordance with a further exemplary aspect of the present application, the instructions when executed by processor 240 cause the processor to carry out steps of method 400 for determining, and identifying information to manage, a level of risk of a first entity. For example, where the institution collecting the data on the first entity and the one or more second entities comprises a financial institution, the financial institution may use the information from the data exchange records to determine, in accordance with method 400, one or more risk levels associated with the first entity in order to inform its decision to, e.g., invest in or provide a monetary loan to the first entity. The financial institution may also use the information gleaned from the data exchange records to provide feedback to the first entity (e.g., in the form goal(s)) to help the first entity manage its risk level(s) and perhaps improve (i.e. lower) its level(s) of risk), and the financial institution may use that revised risk level to reassess its decision to grant a monetary loan or to adjust the loan amount.

With reference to FIGS. 3 and 4, method 400 may comprise steps 302, 304, 306, 320, 330, 332, and 334 of method 300, and transition at "A" from step 334 to the remaining steps of method 400 shown in FIG. 4. With reference to FIG. 4, method 400 may further comprise: determining 402 the level of risk for the first entity based on the rank determined at step 334; determining 404 an amount of a contribution to the first entity based on the determined level of risk; if it is determined 405 that the rank is below (and/or the level of risk is above) a threshold, determining 406 one or more goals over a time period for the first entity for increasing the rank, the goal(s) corresponding respectively to the factor(s) from step 330 (for determining 330 the sector benchmark index and the first entity index) and relating to respective one or more measurable metrics of the first entity; measuring 408 the one or more metrics at or before expiry of the time period; determining 410 an updated first entity index based on the measured metric(s); determining 412 an updated benchmark index for the sector based on the one or more factors of the other entities; comparing 414 the updated first entity index to the updated sector benchmark index; determining 416 an updated rank against the updated benchmark index for the first entity based on the comparison; determining 418 an updated level of risk for the first entity based on the determined updated rank; and adjusting 420 the amount of the contribution to the first entity based on the determined updated risk.

The risk(s) determined at steps 402 and/or 418 may be determined in accordance with any proprietary or known method(s) for quantifying risks based on one or more factors, and the method employed for determining 402 and/or 418 the risk and/or updated risk is not to be considered as limiting the scope of the presently described aspects. In the financial context, "risk" may comprise a risk of the first entity's business failing (which may also include, e.g., a risk of the first entity being unable to pay loans, and/or a risk of a poor return on an investment in the first entity). At step 406, the threshold and the time period may be pre-configured by a user of computing device 110 via input device 230, and/or the instructions may include a default threshold or time period which may be overwritten by user input. Further, method 400 may employ a threshold for the rank (in which case the threshold comprises a lower threshold), the level of risk (in which case the threshold comprises an upper threshold), or both. If at step 405 it is determined, after ranking 334 the first entity that the rank is below a lower threshold, method 400 may proceed to step 402 to determine the level of risk before proceeding to step 404 to determine the amount of the contribution. Alternatively, method 400 may comprise determining 402 the level of risk prior to the determination made at step 405, in which case, if at step 405 it is determined that the level of risk is above an upper threshold, method 400 may proceed to step 404 to determine the amount of the contribution.

As discussed above, the first entity and the one or more second entities may comprise customers of a financial institution, and the contribution may comprise a monetary loan from the financial institution to the first entity. The contribution could also comprise an investment from an investing entity, such as a VC firm or personal investor, where, e.g., the first entity has given permission to the financial institution to release the determined rank and/or level of risk to prospective investors (or where the first entity itself provides this information to prospective investors). It will be appreciated that the step of determining 404 an amount of a contribution to the first entity based on the determined level of risk may also comprise a decision as to whether or not to make a contribution at all; in the context of step 404, if it is determined that a contribution is not to be made, the determined contribution amount would be zero.

Further, if it is determined, at step 405, that the rank is below (and/or the level of risk is above) the threshold, method 400 may proceed to step 404, where the determined contribution amount may be zero, or some initial amount which may be adjusted later at step 420 (depending on the updated level of risk determined at step 418). Alternatively, method 400 may proceed from step 405 directly to step 406 (which path is not shown in FIG. 4).

The one or more metrics for measuring the goal(s) determined at step 406 may comprise accounts receivable, accounts payable, revenues, net profits, employee retention, and/or any other measurable metrics not described herein, such as other types of financial data capable of being monitored and measured. The types of measurable metrics are not intended to restrict the presently described aspects. The metrics may be directly measured from the data exchange records or may be derived therefrom. For example, employee retention may be determined by, e.g., monitoring the number of data exchange records comprising payroll deposits made by the first entity.

As an example, a financial institution may decide that it will not loan money to a first entity that ranks below a lower threshold of, e.g., 7 (out of a maximum ranking of, e.g., 10), as determined by perhaps a proprietary ranking methodology employed by the financial institution. First entities that comprise small businesses or sole proprietorships, while pursuing potentially lucrative endeavours, may not have a level of sophistication or knowledge that would allow them to otherwise come well-equipped with the financial data (e.g. sales figures and forecasts) that would help to secure the loans being sought. A financial institution may use method 400 to, e.g., provide a further opportunity to such first entities, by setting measurable goals for the entities which have associated metrics that may be measured 408 at or before expiry of the established time period. The time period for the first entity to achieve the goals may be set, e.g., to 90, 120, 150, or 365 days, or any other time period. Method 400 therefore provides financial institutions with an option to monitor, via data exchange records in database 140 of the financial institution, first entities in order to conduct due diligence on the first entities and to make an informed decision regarding whether to make a contribution (e.g., a loan) to such entities where, e.g., the first entity in question may show promise, but may have initially lacked the information necessary to secure a loan.

In accordance with further aspects of the present application, method 400 may further comprise steps for providing the first entity with feedback on whether goal(s) have been accomplished, as well as on whether the first entity is on track to accomplish the goal(s). For example, method 400 may further comprise determining 426, upon measuring the one or more metrics at the expiry of the time period, and notifying 424 the first entity of, via communication module 210, which of the one or more goals have been achieved and/or missed. The financial institution may then use the results of the first entity's performance over the time period toward achieving the goals as a basis for further discussions with the first entity about securing a loan, or the financial institution may decide to refuse, grant or adjust the contribution or loan on the basis of the determination made at step 426 (such as in accordance with steps 410-420, or based solely on the determination made at step 426 (the path from 426 to 420 not being shown in FIG. 4)).

As described above, method 400 may also comprise determining 428, upon measuring 408 the one or more metrics, and notifying 424 the first entity of, via communication module 210, progress of the first entity toward achieving the one or more goals by expiry of the time period. The determined progress may include, e.g., indications of percent of goal achieved (e.g., 55% of target revenue for time period achieved), or any other suitable manner of conveying progress, as would be understood by the person of ordinary skill in the art.

Method 400 may also comprise, upon determining 428 the progress of the first entity toward achieving the goal(s) by expiry of the time period, extrapolating 430 from the determined progress a forecast of whether the one or more goals are achievable by expiry of the time period, and notifying 424, via the communication module, the first entity of the forecast. Extrapolation may comprise any known method or technique for extrapolating and forecasting or projecting data based on known data, as would be known to the person of ordinary skill in the art. The notification may comprise an indication that the first entity is on track to achieve the goal(s) or at risk of missing the goal(s) by expiry of the time period. Further, notifying 424 the first entity of the forecast may be done in real-time upon determining the forecast. The first entity may then use the provided information to adjust marketing tactics, supplier relationships, and any other facet of the business that may help the first entity to meet the set goal(s) by expiry of the time period, and to thereby achieve a higher determined 416 updated rank and a higher determined 418 updated level of risk, which in turn may result in the financial institution adjusting 420 the amount of the contribution (such as by deciding to increase a monetary loan amount, or deciding to offer a loan where no loan was previously being offered).

Conversely, where the updated level of risk is above the previously determined 402 level of risk for the first entity (such as where the measured metric(s) show that coffee sales have dropped to 50% from 35% less than competitors' average sales), the financial institution may adjust the amount of a contribution (e.g., a monetary loan) to the first entity to a lesser amount, or decide not to offer a loan at all. Providing the first entity with an indication of progress toward achieving the goal(s), and particularly in real-time, may help the first entity to avoid a failed loan application, and may also help the financial institution to avoid missing out on what may be a sound loan transaction.

In accordance with a further aspect of the present application, method 400 may comprise a mechanism for adjusting one or more of the goals where, e.g., it is determined that the goals initially established were insufficient (due, e.g., to an error in goal setting by the financial institution, new information received from the first entity that impacts the goals, or for any other reason), which may be determined at, e.g., step 428, such as where it is determined 428 that the first entity has met the goals with relative ease and well before expiry of the time period, in which case it may be determined, by both the financial institution and the first entity, that a larger contribution should be sought, and that the goals should be adjusted accordingly (or, alternatively, the original loan amount may be granted without adjusting the goals). As such, method 400 may further comprise (such as upon measuring 408 the metric(s)), determining 422 one or more adjustments to the one or more goals, and notifying 424, via communication module 210, the first entity of the adjusted one or more goals. Method 400 may then carry on from the step of measuring 408 the (now adjusted) metric(s).

In accordance with a further aspect of the present application, the institution having the data exchange records in database 140 may decide to offer products and/or services to the first entity based on any of the analyses of the data exchange records described herein. For example, method 400 may further comprise determining 432 one or more product and/or service offerings based on the level of risk or the level of updated risk determined at steps 402 and 418, respectively, and notifying 424 the first entity, via communication module 210, of the one or more product and/or service offerings. For example, upon determining that the level of risk or updated level of risk for a first entity is acceptable (e.g., in accordance with its own standards), a financial institution may decide to offer the first entity a term deposit product, a line of credit, or any other product or service.

The step of notifying 424 may be as described above for the step of notifying 316, in that it may be done in real-time, by push notification, upon any of the steps of method 400 producing information which the institution (e.g., financial institution) may share with the first entity, such as upon execution of steps 404, 406, 416, 420, 422, 426, 428, 430, and/or 432. Alternatively, first entity 130 may request (such as by a financial or banking app configured to communicate with computing device 110, or which may comprise a client instance of computing device 110 having only informational or reporting features for the user), over network 120 from computing device 110, information from any of the steps of method 400 producing information which may be shared with the first entity, such as the information from steps 404, 406, 416, 420, 422, 426, 428, 430, and/or 432, and pull the relevant information. Further, notifying 424 may occur after any other step of method 400 producing information which the institution (e.g., financial institution) may share with the first entity, such as after steps 402 and/or 418 (to share the determined risk or updated level of risk), for example. As described above, the notification may comprise, for example, an audible and/or visual alert displayed on a display of another device (e.g., a mobile device, computer, tablet, etc.) by which a graphical user interface of an application hosted by the institution (such as a financial or banking app for a financial institution) is accessed by the first entity or a representative of the first entity, or a message sent via communication module 210 to a digital address of such first entity or first entity representative (e.g., SMS, MMS, instant message, email, a proprietary message type, etc.). It will be appreciated by the person skilled in the art that any suitable type of notification message may be used.

Any of the steps of notifying 316 or 424 described herein may comprise notifying an electronic device 132 associated with any entities 130 (such as first entity 130, one or more second entities 130, or other entities 130, as described above), as shown in FIG. 1.

While the foregoing has been described in some detail for purposes of clarity and understanding, it will be appreciated by those skilled in the relevant arts, once they have been made familiar with this disclosure that various changes in form and detail can be made without departing from the true scope of the appended claims. The present application is therefore not to be limited to the exact components or details of methodology or construction set forth above. Except to the extent necessary or inherent in the processes themselves, no particular order to steps or stages of methods or processes described in this disclosure, including in the Figures, is intended or implied. In many cases the order of process or method steps may be varied, and/or made sequential or parallel, without changing the purpose, effect, or import of the method(s) described.

The invention claimed is:

1. A computing device for identifying relevant information for a first entity, the computing device comprising:
    a memory storing computer-executable instructions;
    a communication module for communication with an electronic device associated with said first entity over a network; and
    a processor coupled to the memory and the communication module, the instructions when executed by the processor causing the processor to:

obtain records of data exchanges of the first entity stored in a database accessible to the processor;

apply a trained machine learning process or a trained artificial intelligence process to a portion of the stored records of first entity data exchanges;

determine a sector with which the first entity is associated based on the application of the trained machine learning process or the trained artificial intelligence process to the portion of the stored records of first entity data exchanges;

based on an analysis of records of data exchanges of one or more second entities different from the first entity stored in the database, determine which of the one or more second entities data exchange records involve other entities associated with the sector, and determine a sector associated one or more second entities data exchanges;

determine one or more data baselines based on an analysis of the stored records of the sector associated one or more second entities data exchanges;

determine one or more first entity data baselines based on an analysis of the stored records of the first entity data exchanges, at least one of said one or more first entity data baselines corresponding in type to a respective one of said one or more data baselines;

compare one of said one or more data baseline(s) to a corresponding one of said first entity one or more data baseline(s);

identify said relevant information based on said comparison; and notify, via the communication module, the electronic device associated with the first entity of the relevant information, wherein the electronic device associated with the first entity is notified of the relevant information in real-time, by push notification comprising one or more of an audible and visual alert for display at the electronic device, upon said identifying of said relevant information.

2. The computing device of claim 1 wherein the first entity and the one or more second entities are customers of a financial institution.

3. The computing device of claim 2 wherein the instructions when executed by the processor further cause the processor to determine which of the sector associated one or more second entities data exchanges comprises data exchanges of personal entities, and wherein said one or more data baselines comprises one or more baselines for the personal entities.

4. The computing device of claim 3 wherein said one or more baselines for the personal entities comprise transacting merchant, data exchange location, payment amount, and/or payment type.

5. The computing device of claim 1 wherein the instructions when executed by the processor further cause the processor to:

analyze the stored records of the other entities in the sector; and determine a benchmark index for the sector and an index for the first entity based on one or more factors of the other entities and the first entity, respectively.

6. The computing device of claim 5 wherein the one or more factors comprise, for a time period: revenues, profits, and/or volume of product sold.

7. The computing device of claim 5 wherein the instructions when executed by the processor further cause the processor to compare the first entity index to the sector benchmark index and to rank the first entity against the other entities based on the comparison, the relevant information comprising the rank.

8. The computing device of claim 1 wherein the first entity and the other entities are business entities, and wherein the instructions when executed by the processor further cause the processor to:

analyze the stored records of the other entities associated with the sector; and identify, based on the analysis of the stored records of the other entities associated with the sector, one or more potential business-to-business opportunities for the first entity;

wherein the relevant information comprises the one or more potential business-to-business opportunities.

9. The computing device of claim 1 wherein the instructions when executed by the processor further cause the processor to form one or more recommendations for the first entity from the analyzed records of the one or more second entities data exchanges, the relevant information comprising the one or more recommendations.

10. The computing device of claim 1 wherein the instructions when executed by the processor further cause the processor to extrapolate from the analyzed records of the one or more second entities data exchanges to forecast one or more trends, the relevant information comprising the forecasted one or more trends.

11. The computing device of claim 1 wherein the instructions when executed by the processor further cause the processor to identify one or more instances of fraudulent data exchanges from the analyzed records of the one or more second entities data exchanges, the relevant information comprising the one or more instances of fraudulent data exchanges.

12. The computing device of claim 1, wherein the instructions when executed by the processor further cause the processor to:

receive input from the electronic device via the communications module, the input identifying the sector; and determine the sector with which the first entity is associated based on an analysis of the received input.

13. The computing device of claim 1, wherein the instructions when executed by the processor further cause the processor to determine the one or more first entity data baselines based on the application of the trained machine learning process or the trained artificial intelligence process to the portion of the stored records of first entity data exchanges.

14. The computing device of claim 1, wherein the instructions when executed by the processor further cause the processor to:

apply the trained machine learning process or a trained artificial intelligence process to a portion of the stored records of the one or more second entities data exchanges; and determine the sector associated one or more second entities data exchanges based on the application of the trained machine learning process or the trained artificial intelligence process to the portion of the stored records of the one or more second entities data exchanges.

15. The computing device of claim 1, wherein the instructions when executed by the processor further cause the processor to:

apply the trained machine learning process or a trained artificial intelligence process to a portion of the stored records of the sector associated one or more second entities data exchanges; and determine the one or more data baselines based on the application of the trained machine learning process or the trained artificial intelligence process to the portion of the stored records of the sector associated one or more second entities data exchanges.

16. A computer-implemented method for identifying relevant information for a first entity, the method comprising:

obtaining records of data exchanges of the first entity stored in a database accessible to a processor of a computing device;

applying a trained machine learning process or a trained artificial intelligence process to a portion of the stored records of first entity data exchanges;

determining a sector with which the first entity is associated based on the application of the trained machine learning process or the trained artificial intelligence process to the portion of stored records of first entity data exchanges;

based on an analysis of records of data exchanges of one or more second entities different from the first entity stored in the database, determining which of the one or more second entities data exchange records involve other entities associated with the sector, and determining sector associated one or more second entities data exchanges;

determining one or more data baselines based on an analysis of the stored records of the sector associated one or more second entities data exchanges;

determining one or more first entity data baselines based on an analysis of the stored records of the first entity data exchanges, at least one of said one or more first entity data baselines corresponding in type to a respective one of said one or more data baselines;

comparing one of said one or more data baseline(s) to a corresponding one of said first entity one or more data baseline(s);

identifying said relevant information based on said comparing; and notifying, via a communication module of the computing device, over a network, an electronic device associated with the first entity of the relevant information, wherein the electronic device associated with the first entity is notified of the relevant information in real-time, by push notification comprising one or more of an audible and visual alert for display at the electronic device, upon said identifying of said relevant information.

17. The method of claim 16 wherein the first entity and the one or more second entities are customers of a financial institution.

18. The method of claim 16 further comprising determining which of the sector associated one or more second entities data exchanges comprises data exchanges of personal entities, wherein said one or more data baselines comprises one or more baselines for the personal entities.

19. The method of claim 18 further comprising comparing the first entity index to the sector benchmark index and ranking the first entity against the other entities based on the comparing, the relevant information comprising the rank.

20. The method of claim 16 further comprising:

analyzing the stored records of the other entities in the sector; and determining a benchmark index for the sector and an index for the first entity based on one or more factors of the other entities and the first entity, respectively.

21. A non-transitory computer-readable medium comprising computer-executable instructions for identifying relevant information for a first entity, the instructions when executed by a processor of a computing device causing the processor to:

obtain records of data exchanges of the first entity stored in a database accessible to the processor;

apply a trained machine learning process or a trained artificial intelligence process to a portion of the stored records of first entity data exchanges;

determine a sector with which the first entity is associated based on the application of the trained machine learning process or the trained artificial intelligence process to the portion of the stored records of first entity data exchanges;

based on an analysis of records of data exchanges of one or more second entities different from the first entity stored in the database, determine which of the one or more second entities data exchange records involve other entities associated with the sector, and determine sector associated one or more second entities data exchanges;

determine one or more data baselines based on an analysis of the stored records of the sector associated one or more second entities data exchanges;

determine one or more first entity data baselines based on an analysis of the stored records of the first entity data exchanges, at least one of said one or more first entity data baselines corresponding in type to a respective one of said one or more data baselines;

compare one of said one or more data baseline(s) to a corresponding one of said first entity one or more data baseline(s);

identify said relevant information based on said comparison; and notify, via a communication module of the computing device, over a network, the electronic device associated with the first entity of the relevant information, wherein the electronic device associated with the first entity is notified of the relevant information in real-time, by push notification comprising one or more of an audible and visual alert for display at the electronic device, upon said identifying of said relevant information.

22. The non-transitory computer-readable medium of claim 21 wherein the first entity and the one or more second entities are customers of a financial institution.

* * * * *